Jan. 28, 1969  G. MECKLER  3,424,233
COMFORT CONDITIONING SYSTEM
Filed June 22, 1967  Sheet 1 of 3
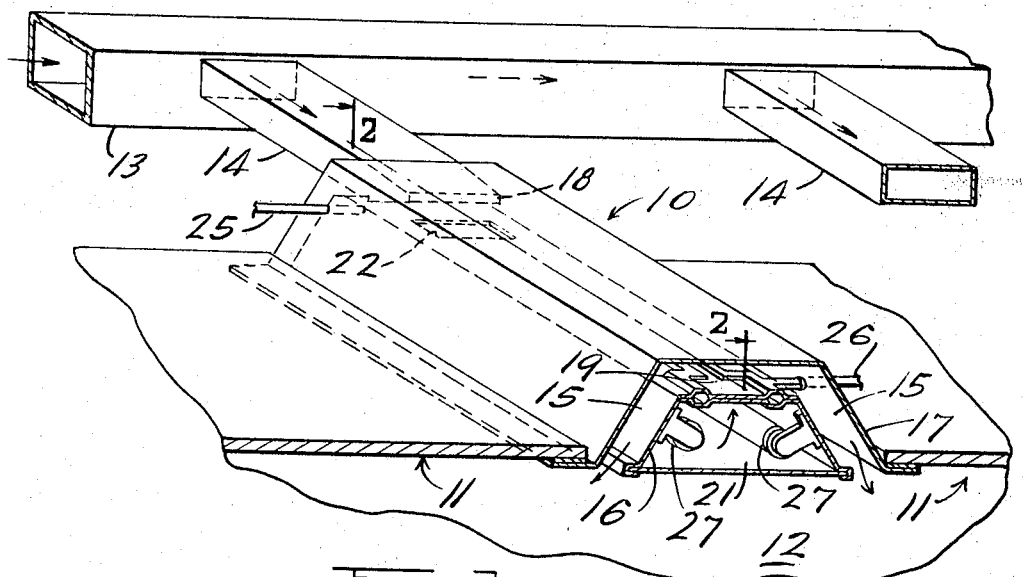
FIG-1-
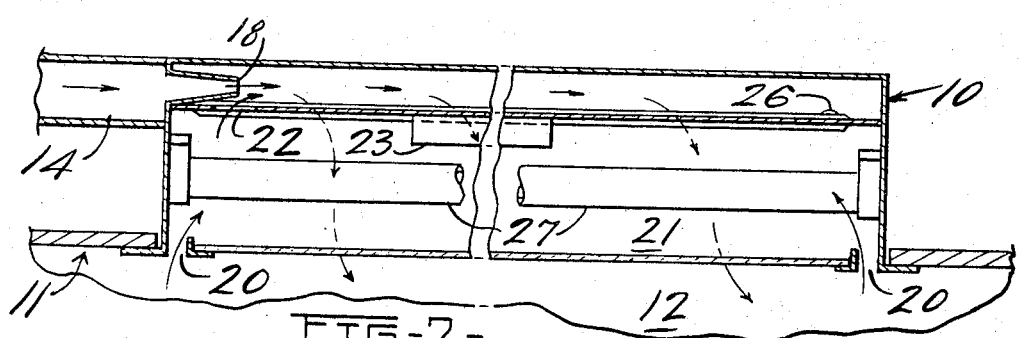
FIG-2-
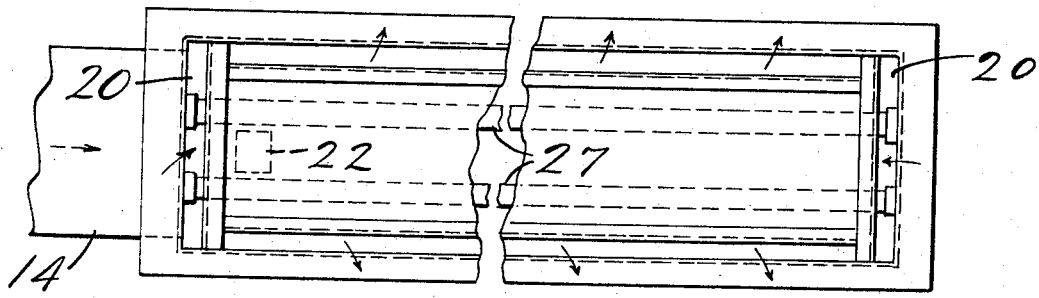
FIG-3-
INVENTOR:
GERSHON MECKLER.
BY
Owen + Owen
ATT'YS.

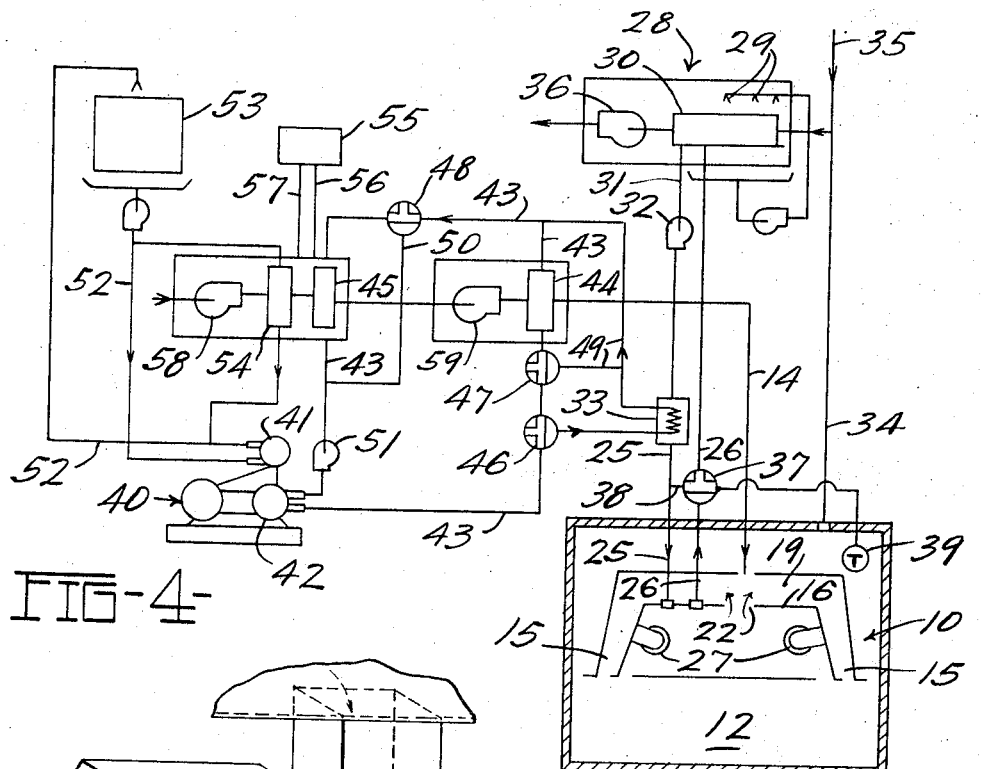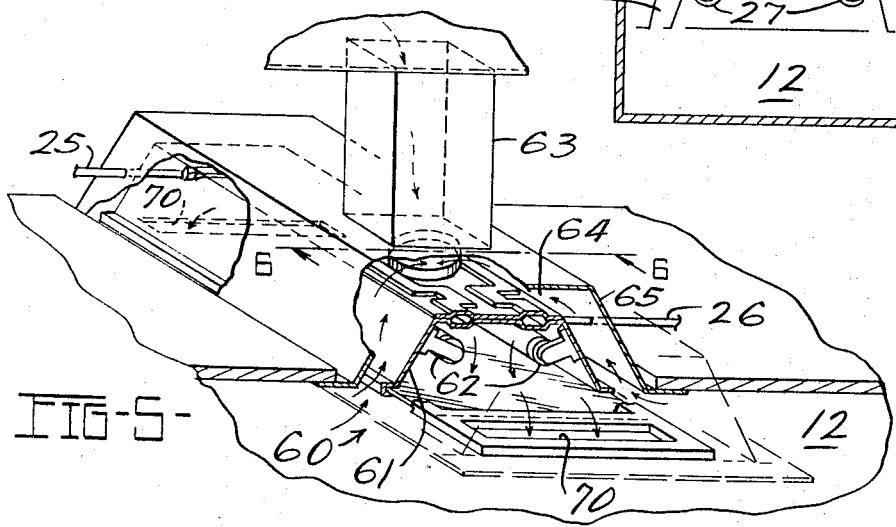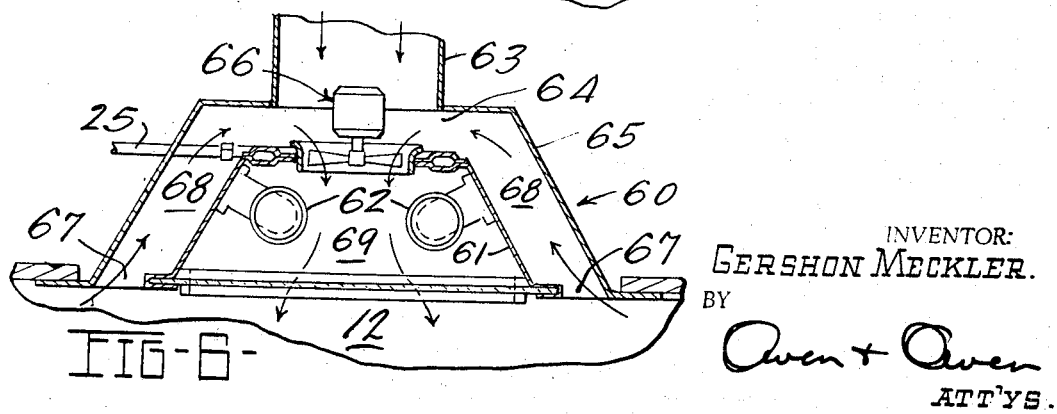

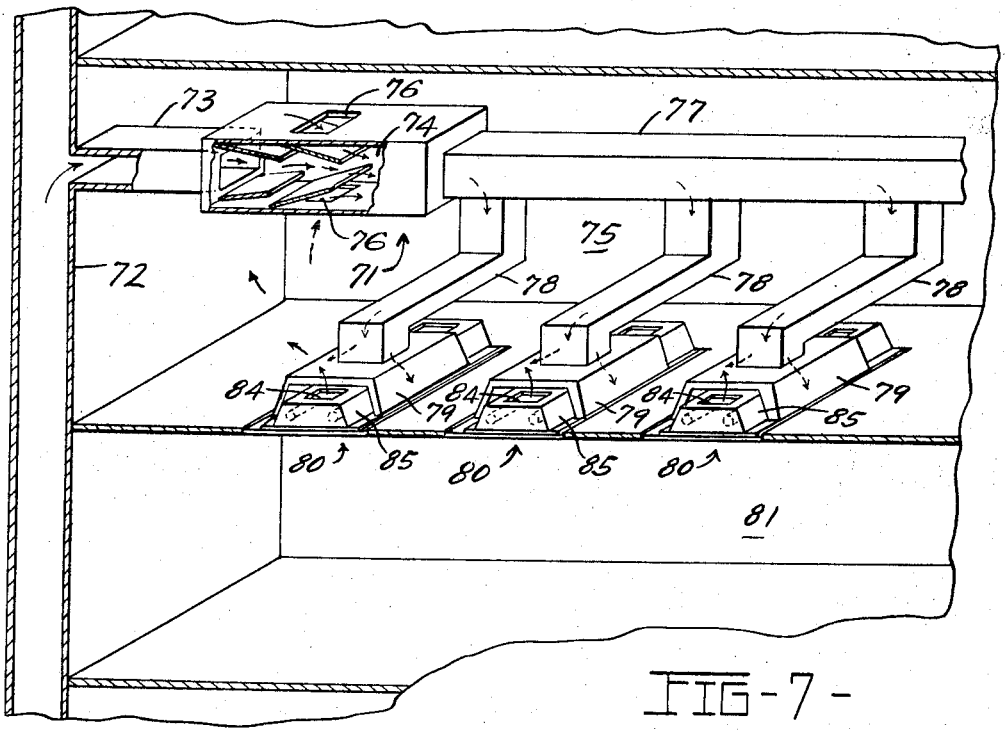
FIG-7-
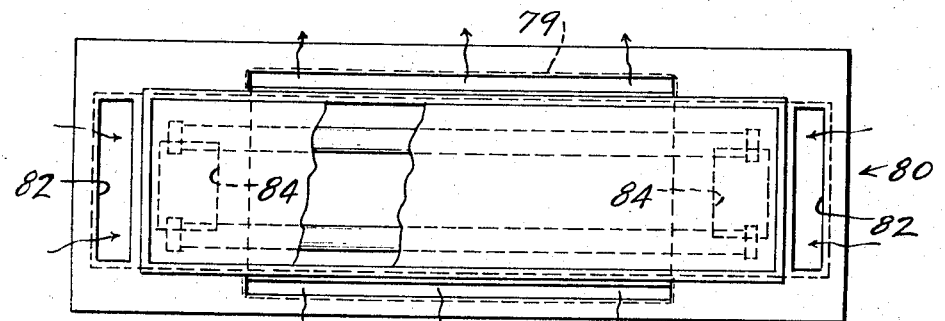
FIG-8-
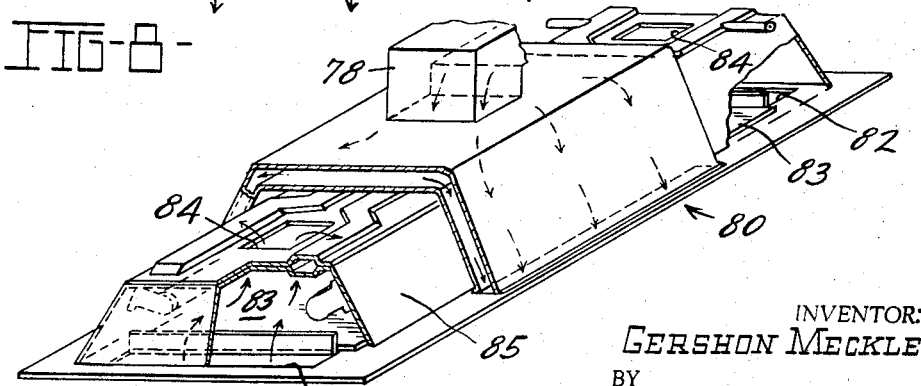
FIG-9-
INVENTOR:
GERSHON MECKLER.
BY
Owen + Owen
ATT'YS.

United States Patent Office 3,424,233
Patented Jan. 28, 1969

3,424,233
COMFORT CONDITIONING SYSTEM
Gershon Meckler, Atlanta, Ga., assignor to Lithonia Lighting, Inc., Conyers, Ga., a corporation of Georgia
Filed June 22, 1967, Ser. No. 648,119
U.S. Cl. 165—48     5 Claims
Int. Cl. F25b 29/00; F24j 3/04; F24f 7/06

ABSTRACT OF THE DISCLOSURE

Primary conditioned air is delivered to space at minimum required for ventilation, and mixed with recirculated air to provide circulation adequate for comfort. The air recirculation is through a lighting fixture from which lighting heat is removed by cooled water under maximum load conditions, or only partially removed under reduced load conditions as required to maintain a desired control temperature within a space. The air recirculation can be induced by the flow of primary conditioned air. The removal of heat can be by cooled water circulated through passages in a reflector of the lighting fixture, and control over the removal of lighting heat absorbed by the circulated water can be under the control of a thermostat space which diverts available water whenever excess cooling capacity is available.

The prior art

Until quite recently the so-called "dual duct" system has constituted the principal means for localized or zone temperature control in an air conditioning system. According to the dual duct system, both chilled air and heated air are supplied to each space to be air conditioned. The heated air and cool air are mixed, as required, in a suitable mixing box to provide a mixed stream at a suitable temperature to perform the conditioning job required at any particular instant. As the heat load increases, the proportion of the cooled air is increased, and as the heat load decreases, the proportion of heated air is increased. The mixing is ordinarily under the control of an appropriate thermostat which is responsive to the temperature of air in a given zone of the space to be conditioned.

More recently, it has been suggested that heat from lights within a space to be air conditioned can be rejected, or utilized for reheat, as may from time to time be required to maintain a predetermined comfort condition, depending upon the load which is imposed upon the space. The rejection of heat can be to water or another heat transfer fluid circulated through reflectors of lighting fixtures within the space to be conditioned. "Reheat" can be avoided when maximum cooling is required by circulating air for mixture with primary conditioned air to avoid reheat by the lighting fixtures. When minimum cooling is required, air for mixture with primary conditioned air can be circulated for maximum reheat by lighting fixtures. When intermediate cooling is required a combination of the two circulations can be used.

The instant invention

The present invention is based upon the discovery of new means for controlling temperature in an air conditioning system where intercepted lighting heat is transferred to water or another heat transfer fluid, so that primary conditioned air at approximately the minimum flow required for ventilation purposes can be supplied to perform the principal air conditioning function. Since the circulation of primary conditioned air at the minimum rate required for ventilation purposes does not provide an air flow adequate for comfort, it is desirable to supplement this circulation. This is accomplished, according to the invention, by mixing air recirculated from the space to be conditioned with the primary conditioned air, so that the circulation of primary conditioned air and of recirculated air is adequate, from the standpoint of circulation rate. Temperature control is achieved by passing the recirculated air in heat exchange relationship with a light fixture, and by controlling the transfer of heat from the lighting fixture to water or another heat transfer liquid as required to maintain a desired temperature.

Objects of the invention

It is an object of the invention to provide an improved comfort conditioning system.

It is a further object of the invention to provide a comfort conditioning system wherein temperature control is achieved by virtue of control over the transfer of heat from lighting fixtures to water or another heat transfer liquid.

It is still another object of the invention to provide a comfort conditioning system wherein primary conditioned air is delivered to a space to be conditioned at substantially the minimum rate required for ventilation purposes, wherein air circulation is augmented by recirculation of air through a lighting fixture, and wherein temperature control is achieved by virtue of control over the transfer of heat from lighting fixtures to water or to another heat transfer liquid circulated through the fixtures.

Other objects and advantages will be apparent from the description which follows, reference being made to the accompanying drawings, in which:

FIG. 1 is a perspective view showing a portion of a ceiling which includes an air conditioning system according to the invention and, in particular, a lighting fixture peculiarly adapted for use in such system.

FIG. 2 is a vertical sectional view along the line 2—2 of FIG. 1, and showing details of the lighting fixture peculiarly adapted for use in the system.

FIG. 3 is a plan view of the lighting fixture of FIG. 2, and showing the fixture as seen from below.

FIG. 4 is a schematic representation of an air conditioning system according to the invention, and showing one mode for incorporating a lighting fixture as shown in FIGS. 1–3 in such system.

FIG. 5 is a perspective view similar to FIG. 1 of another embodiment of the invention.

FIG. 6 is a vertical sectional view along the line 6—6 of FIG. 5, and showing details of the lighting fixture.

FIG. 7 is a perspective view similar to FIG. 1, but showing an embodiment of a system according to the invention which is particularly advantageous for temperature control in relatively large spaces lighted by a plurality of lighting fixtures.

FIG. 8 is a bottom plan view of a lighting fixture which constitutes a part of the system of FIG. 7.

FIG. 9 is a perspective view, with parts broken away to show details of construction, of the lighting fixture of FIG. 8.

Referring now, in more detail to the drawings, and, in particular, to FIG. 1, in an air conditioning system according to the invention, a particular type of lighting fixture 10 is conveniently installed in conjunction with panels 11 to constitute a ceiling for a space 12 to be air conditioned. Conditioned air is supplied from a duct 13 through supply ducts 14 for delivery through the lighting fixture 10 to the space 12. Air delivered to the lighting fixture 10 from the supply duct 14 flows downwardly through passages 15 on either side of a reflector 16, and between the reflector 16 and an outer housing 17, into the space 12.

Referring now to FIG. 2, air from the supply duct 14 flows through an orifice 18, and into an upper channel 19 of the fixture 10. Flow of room air is induced through passages 20 into a cavity 21 inside the reflector 16, and through an opening 22 from the cavity 21 into the passage 19, for mixture with primary conditioned air. It is, then, the mixture of primary conditioned air and recirculated air that is delivered through the passages 15, as shown in FIG. 1, to the space 12. A ballast 23 for the fixture 10 is shown within the cavity 21.

Various details of the lighting fixture 10 will be apparent from FIG. 3.

As shown in FIG. 4, water from a line 25 is circulated through suitable passages in the reflector 16 of the light fixture 10 to absorb heat, as required, and is returned to a line 26. The reflector 16 can conveniently be formed of two sheets of aluminum or other suitable material, with cooperating partial passages formed in each, suitably bonded together, e.g. by a process known as "roll bonding." The complete passages are then an integral part of the reflector 16, and need only be connected suitably to the lines 25 and 26. The water circulated through the passages in the reflector 16 absorbs heat given off by fluorescent tubes 27, or other light sources. As a consequence, water in the line 26 is ordinarily warmer than water in the line 25, and is circulated to an evaporative cooler 28 wherein water from spray heads 29 is evaporated to cause heat absorption. The heat transfer from the water to be cooled is indirect, in a contactor 30, from which the cooled water is circulated through a line 31 by a pump 32 and through a heat exchanger 33 back to the line 25.

Relief air from the space 12 can be delivered to the evaporative cooler 28 through a line 34, ambient air can be so delivered through a line 35, or a combination of the two can be used to cause evaporation of water from the spray heads 29. The air flow through the evaporative cooler 28 is induced by a blower 36.

Temperature control in the space 12 is accomplished by control of the amount of heat transferred from the reflector 16 to water leaving the passages in the reflector 16 through the pipe 26. As shown in FIG. 4, a three-way valve 37 is positioned to prevent water flow from the reflector through the pipe 26; instead, the circulation is from the pipe 25, through a bypass 38 and the valve 37, and then through the pipe 26 back to the evaporative cooler 28. This is the correct position for the valve 37, which is controlled by a thermostat controller 39, when the temperature in the space 12 is below the desired temperature of, say, 75° F. This means, in essence, that the load in the space 12 is low by comparison with the capability of the primary conditioned air delivered through the duct 14 to the fixture 10 and then through the passages 19 and 15 to the space 12. As has been explained above, this flow of primary conditioned air induces a flow of room air from the space 12 through the fixture 10 for mixing with the primary conditioned air and return therewith through the passages 15 to the space 12. When the valve 37 is in the position shown, heat from the fluorescent tubes 27 is transferred to the room air circulated through the fixture 10 and, consequently, compensates for the excessive capacity of the primary conditioned air.

When the temperature in the space 12 is above the control temperature of, say, 75° F. water is circulated through the passages in the reflector 16, for example because the valve 37 has been rotated clockwise 90° from the position shown in FIG. 4, and by the action to thermostat controller 39. In this position, water flow is from the line 25, through the passages of the reflector 16 and to the pipe 26. In this valve position the water absorbs the maximum lighting heat possible at the rate of circulation used, and at the temperature to which the water is cooled in the evaporative cooler 28. If the space 12 remains above the control temperature the indirect heat exchanger 33 can be used (as subsequently explained) to lower the temperature of the water delivered by the pipe 25. It is usually preferred that the valve 37 be of the proportioning type so that, depending upon position, any proportion of the water circulated through the pipe 25 can be diverted through the bypass 38.

Apart from the details discussed above, the air conditioning apparatus of FIG. 4 is conventional. It includes refrigerating apparatus comprising a compressor 40, a condenser 41 and an evaporator 42. The evaporator 42 is used to provide chilled water which is circulated through a line 43 to the indirect heat exchanger 33, to a sensible cooling coil 44 and to a second stage 45 of a chemical dehumidifier. Three-way valves 46, 47 and 48 control the flow of chilled water to the indirect heat exchanger 33, the sensible coil 44 and the second stage 45, respectively. Bypass lines 49 and 50 are provided around the sensible coil 44 and the second stage 45, respectively. A pump 51 is provided in the line 43 for circulation of the chilled water as described. Heat is transferred from the condenser 41 by water circulated through a line 52 from a cooling tower 53. Water from the tower 53 is also used to absorb heat in a first stage 54 of the chemical dehumidifier. The dehumidifier also includes a regenerator 55 and lines 56 and 57 through which dilute and concentrated desiccant are circulated.

Ambient air is introduced into the system by a blower 58, and is dehumidified by the first stage 54 and the second stage 45 of the chemical dehumidifier. The dehumidified air is then cooled to a desired temperature by the sensible cooling coil 44, and is ultimately introduced into the supply duct 14.

It will be appreciated that, when possible, it is usually preferred to avoid refrigerating water returning from the evaporative cooler 28, i.e., in the indirect heat exchanger 33. When the system is designed for such operation, the valve 46 is normally in the position shown in FIG. 4, and is used to divert some chilled water to the exchanger 33 only when water from the evaporative cooler is above the minimum temperature required to perform the heat absorption job which is required. If, for some reason, there is excess refrigeration capacity, the evaporative cooler 28 can be eliminated altogether, and the indirect heat exchanger 33 can be used as the sole means for removing heat from the circulated water.

The system according to the invention is peculiarly adapted for zone temperature control in relatively large buildings. Such buildings ordinarily have an interior zone and four characteristically different perimeter zones: north, east, south and west. The air conditioning loads in the five different zones are characteristically different. Fluctuations in interior load zone are attributable principally to variations in occupancy and to variations in the rate at which energy is released from within the space. In addition, the east, south and west perimeter zones are subject to substantial variations in load attributable to radiant energy from the sun. The temperature control system according to the invention is capable of maintaining a constant temperature notwithstanding substantial variations in total load, or in load within a particular zone. The system is illustrated in FIG. 4 in connection with a single light fixture with its own bypass 38 under the control of the valve 37. Such an arrangement, with a bypass for each light fixture, may be desirable in some instances while, in others, it may be advantageous to control the absorption of heat from a number of light fixtures with a single bypass and temperature responsive control. By way of example, a large interior room having a large number of light fixtures probably would constitute a single zone wherein load fluctuations would affect the entire room, so that all of the many light fixtures therein could be under the control of a single bypass and valve. On the other hand, a small room with only a single light fixture, and subject for any reason to substantial variations in load would require a separate bypass, valve and control for its single light fixture.

Referring, now, to FIGS. 5 and 6, another embodiment of a light fixture according to the invention is indicated generally at 60. The light fixture 60 includes a reflector 61 within which fluorescent tubes 62 are suitably mounted. Fresh, conditioned air is introduced from a downwardly directed duct stub 63 into a space 64 between the exterior of the reflector 61 and an outer housing 65. A motor driven fan 66 (FIG. 6) blows conditioned air from the duct stub 63 and recirculated air which is induced to flow upwardly from a conditioned spaced 12 through openings 67 and passages 68, downwardly through a light cavity 69 within the reflector 61. A mixture of conditioned air from the duct stub 63 and recirculated air from the passages 68 is then returned to the space 12 through openings 70 (FIG. 5) at either end of the light fixture 60.

Zone temperature control is accomplished, in the arrangement shown in FIGS. 5 and 6, in the same manner as in the arrangement shown in FIGS. 1–3, by control over the amount of heat removed from the reflector 61 by circulation through integral channels (not shown) of a suitable heat transfer fluid. It will be apparent that the fan arrangement shown in FIGS. 5 and 6 could be used in the system shown in FIGS. 1–3, and that a turbine-type fan which is driven by primary conditioned air and, as a consequence of being so driven, induces a flow of recirculated room air, can be substituted for the motor driven fan of FIGS. 5 and 6. Similarly, an orifice can be used in the structure of FIGS. 5 and 6 to induce a recirculation of room air as in the structure of FIGS. 1–3.

Referring, now, to FIG. 7, one embodiment of apparatus according to the invention utilizes an induction type mixing box indicated generally at 71 to provide a mixture of conditioned air and recirculated air. Conditioned air from a riser 72 is delivered to the mixing box 71 through a duct 73 and, as a consequence of a pressure drop caused by an orifice 74 induces a flow of air from a plenum 75, through openings 76 and into the mixing box 71. A mixture of conditioned air and plenum air, then, is delivered from the mixing box 71 to a duct 77 and, through duct stubs 78 to air inlets 79 which are mounted on lighting fixtures indicated generally at 80. The mixture of plenum air and conditioned air is delivered from the inlets 79 to a space 81.

Flow of air from the plenum 75 into the mixing box 71, as described, causes a pressure drop within the plenum 75. This pressure drop causes a flow of air from the space 81 through the light cavities of the fixtures 80, and into a plenum 75. As can be seen in FIG. 9, the flow of air from the space 81 through the light cavity of the fixtures 80 is through openings 82, into the light cavity 83, and from the cavity 83 through openings 84 into the plenum 75.

Like the previously described ones, the fixtures 80 include reflectors 85 having integral passages through which water or another heat transfer fluid is circulated. Temperature of the space 81 is controlled as previously described by control of the temperature of the water or other heat transfer fluid circulated through the integral passages of the reflectors 85.

It will be apparent that a motor driven fan or turbine-type fan driven by primary conditioned air can be used in the mixing box 71 in place of the orifice 74 to cause a flow of air from the plenum 75 into the mixing box 71.

The invention has previously been described relative to apparatus where air from a space to be conditioned is deliberately recirculated, mixed with conditioned air and returned therewith to the space. Such an arrangement is particularly advantageous because it enables the supplying of conditioned air, for example from the riser 72 of FIG. 7, at a temperature sufficiently low that the air, if introduced directly into the space 81, would cause a condition of discomfort. For example, conditioned air at 45° F. might be available in the riser 72, and might be mixed in the box 71 with an equal volume of air from the plenum 75. Assuming a plenum air temperature of 75° F. and equal specific heats, mixed air at 60° F. would be delivered to the space 81. Introducing air at 45° F. directly into the space 81 would cause a condtion of discomfort, but the mixture of conditioned air and recirculated air does not cause such a condition. Insofar as performing the required air conditioning function is concerned, the same result could be achieved by supplying air from the riser 72 at 60° F., but at twice the rate: this is less desirable, because doubling the rate at which conditioned air is supplied necessitates increasing the pressure within the riser 72, increasing the cross section of the riser 72, or both, with corresponding increase in cost.

Apparatus according to the invention is concerned, in the main, with zone control over temperature, and accomplishes such zone control without the need for circulating heated air for mixture with cooled air to accomplish zone control (the so-called "dual duct" system), and without the need for varying the rate at which conditioned air is delivered to the space. Insofar as zone control over temperature is concerned, it is immaterial, in the example of the preceding paragraph, whether conditioned air in the riser 72 is at 60° F., or whether it is a mixture of conditioned air and recirculated air that is at 60° F., so long as the apparatus includes means to control the temperature of water circulated through passages in a reflector of a lighting fixture, as described, and so long as the temperature of the air delivered to the space, whether or not there is recirculation, depends upon such temperature. By way of example, apparatus including the light fixture 60 of FIGS. 5 and 6 could be operated with equal satisfaction, insofar as zone control over temperature is concerned, if the opening 67 were closed and twice the flow of air at, say, 60° F. were supplied to the duct stub 63, and the apparatus were otherwise operated as previously described.

It will be apparent that various changes and modifications can be made from the specific details set forth herein and shown in the attached drawings without departing from the spirit and scope of the invention as defined in the appended claims.

What I claim is:

1. Apparatus for comfort conditioning of a closed space comprising, in combination, an air supply conduit having an air mixing portion, and a terminal portion which discharges into the closed space, means for causing a flow of conditioned air through said conduit to the space, at least one light fixture mounted to illuminate the space, and comprising a reflector having a top, side and end walls, and an opening opposite said top, said reflector also having integral passages therein for circulation therethrough of a heat-transfer fluid, said light fixture also including at least one light source suitably mounted within said reflector and said fixture having at least one passage portion through which air can flow from the closed space, in heat-transfer relationship with said reflector, and into the air mixing portion of said air supply conduit, means for causing a flow of air from the closed space through said passage portion in heat-transfer relationship with said reflector and into the mixing portion, means for circulating a liquid heat-transfer fluid through the integral passages of said reflector, and means responsive to the temperature in the closed space, and effective to control the temperature of the liquid heat-transfer fluid in the integral passages of said reflector by increasing that temperature when the space temperature is below a control temperature, and by decreasing that temperature when the space temperature is above the control temperature.

2. Apparatus for comfort conditioning of a closed space comprising, in combination, an air conduit having an air mixing portion, and a terminal portion which communicates between said mixing portion and the closed space, at least one light fixture mounted to illuminate the space, and comprising a reflector having a top, side and end walls, and an opening opposite said top, said reflector also having integral passages therein for circulation therethrough of a heat-transfer fluid, said light fixture also including at least one light source suitably mounted within said reflector and said apparatus having means providing at least one passage portion through which air can flow between the opening of said reflector and said air mixing portion of said air supply conduit, in heat-transfer relationship with said reflector, means for causing a flow of conditioned air to the mixing portion of said conduit and through one of the terminal portion and the passage portion to the space, means for causing a flow of air from the space through the other of the terminal portion and the passage portion, into the mixing portion, and, mixed with the conditioned air, back to the space, means for circulating a liquid heat-transfer fluid through the integral passages of said reflector, and means responsive to the temperature in the closed space, and effective to control the temperature of the liquid heat-transfer fluid in the integral passages of said reflector by increasing that temperature when the space temperature is below a control temperature, and by decreasing that temperature when the space temperature is above the control temperature.

3. Apparatus for comfort conditioning of a closed space comprising, in combination, an air conduit having an air mixing portion, and a terminal portion which communicates between said mixing portion and the closed space, at least one light fixture mounted to illuminate the space, and comprising a reflector having a top, side and end walls, and an opening opposite said top, said reflector also having integral passages therein for circulation therethrough of a heat-transfer fluid, said light fixture also including at least one light source suitably mounted within said reflector and said apparatus having means providing at least one passage portion through which air can flow between the opening of said reflector and said air mixing portion of said air supply conduit, in heat-transfer relationship with said reflector, means for causing a flow of conditioned air to the mixing portion of said conduit and through the passage portion to the space, means for causing a flow of air from the space through the terminal portion, into the mixing portion, and, mixed with the conditioned air, back to the space, means for circulating a liquid heat-transfer fluid through the integral passages of said reflector, and means responsive to the temperature in the closed space, and effective to control the temperature of the liquid heat-transfer fluid in the integral passages of said reflector by increasing that temperature when the space temperature is below a control temperature, and by decreasing that temperature when the space temperature is above the control temperature.

4. Apparatus for comfort conditioning of a closed space comprising, in combination, an air conduit having an air mixing portion, and a terminal portion which communicates between said mixing portion and the closed space, at least one light fixture mounted to illuminate the space, and comprising a reflector having a top, side and end walls, and an opening opposite said top, said reflector also having integral passages therein for circulation therethrough of a heat-transfer fluid, said light fixture also including at least one light source suitably mounted within said reflector and said apparatus having means providing at least one passage portion through which air can flow between the opening of said reflector and said air mixing portion of said air supply conduit, in heat-transfer relationship with said reflector, means for causing a flow of conditioned air to the mixing portion of said conduit and through the terminal portion to the space, means for causing a flow of air from the space through the passage portion, into the mixing portion, and, mixed with the conditioned air, back to the space, means for circulating a liquid heat-transfer fluid through the integral passages of said reflector, and means responsive to the temperature in the closed space, and effective to control the temperature of the liquid heat-transfer fluid in the integral passages of said reflector by increasing that temperature when the space temperature is below a control temperature, and by decreasing that temperature when the space temperature is above the control temperature.

5. Apparatus for comfort conditioning of a closed space comprising, in combination, at least one light fixture mounted to illuminate the space, and comprising a reflector having a top, side and end walls, and an opening opposite said top, said reflector also having integral passages therein for circulation therethrough of a heat-transfer fluid, said light fixture also including at least one light source suitably mounted within said reflector and said apparatus having means for causing a flow of conditioned air in heat-transfer relationship with said reflector and into the space, means for circulating a liquid heat-transfer fluid through the integral passages of said reflector, and means responsive to the temperature in the closed space, and effective to control the temperature of the liquid heat-transfer fluid in the integral passages of said reflector by increasing that temperature when the space temperature is below a control temperature, and by decreasing that temperature when the space temperature is above the control temperature.

References Cited
UNITED STATES PATENTS

| | | | |
|---|---|---|---|
| 3,393,728 | 7/1968 | Davis | 165—48 |
| 2,960,602 | 11/1960 | Kurth et al. | 98—40 XR |
| 3,114,505 | 12/1963 | Kennedy | 263—13 |
| 3,165,051 | 1/1965 | Archer et al. | 98—40 |
| 3,193,001 | 7/1965 | Meckler | 98—40 XR |
| 3,372,739 | 3/1968 | Kastovich et al. | 165—53 XR |

FRED C. MATTERN, JR., *Primary Examiner.*

MANUEL ANTONAKAS, *Assistant Examiner.*

U.S. Cl. X.R.

236—13; 98—40